(12) United States Patent
Zapryanov

(10) Patent No.: US 11,400,815 B2
(45) Date of Patent: Aug. 2, 2022

(54) DISPLAY UNIT FOR A HYBRID VEHICLE

(71) Applicant: Bayerische Motoren Werke Aktiengesellschaft, Munich (DE)

(72) Inventor: Grigor Zapryanov, Garching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 295 days.

(21) Appl. No.: 16/519,811

(22) Filed: Jul. 23, 2019

(65) Prior Publication Data
US 2019/0344665 A1 Nov. 14, 2019

Related U.S. Application Data

(63) Continuation of application No. PCT/EP2018/061555, filed on May 4, 2018.

(30) Foreign Application Priority Data

May 5, 2017 (DE) ...................... 10 2017 207 642.9

(51) Int. Cl.
*B60K 37/02* (2006.01)
*G01D 7/08* (2006.01)
*B60W 50/14* (2020.01)

(52) U.S. Cl.
CPC ............... *B60K 37/02* (2013.01); *G01D 7/08* (2013.01); *B60K 2370/169* (2019.05);
(Continued)

(58) Field of Classification Search
CPC .... B60K 37/02; B60K 2370/169; G01D 7/08; B60W 2530/209; B60W 2050/146; B60W 2510/244
See application file for complete search history.

(56) References Cited

U.S. PATENT DOCUMENTS

| 7,474,309 | B2 | 1/2009 | Kolpasky et al. |
| 2010/0274426 | A1 | 10/2010 | Le Brusq et al. |

(Continued)

FOREIGN PATENT DOCUMENTS

| CN | 103707777 A | 4/2014 |
| CN | 104968551 A | 10/2015 |

(Continued)

OTHER PUBLICATIONS

German-language Search Report issued in counterpart German Application No. 10 2017 207 642.9 dated Jun. 25, 2018 with partial English translation (17 pages).

(Continued)

*Primary Examiner* — Tyler J Lee
*Assistant Examiner* — Yufeng Zhang
(74) *Attorney, Agent, or Firm* — Crowell & Moring LLP

(57) ABSTRACT

A display unit for a hybrid vehicle having at least one internal combustion engine-powered drive and at least one electric motor-powered drive, includes the following components: a first electronic determining module for determining the proportion of the current or averaged total fuel consumption used for charging the energy accumulator for the electric motor-powered drive, and/or for determining the proportion of the current or averaged total fuel consumption used to drive the hybrid vehicle; and a first display element for displaying at least this determined charge-fuel proportion and/or this determined drive-fuel proportion, in addition to the total fuel consumption.

4 Claims, 2 Drawing Sheets

(52) U.S. Cl.
CPC . *B60W 2050/146* (2013.01); *B60W 2510/244* (2013.01); *B60W 2530/209* (2020.02)

(56) References Cited

U.S. PATENT DOCUMENTS

| | | |
|---|---|---|
| 2012/0179313 A1 | 7/2012 | Hartl et al. |
| 2014/0142836 A1 | 5/2014 | Yabuta |
| 2015/0307109 A1 | 10/2015 | Graf et al. |
| 2018/0264967 A1 | 9/2018 | Damjanovic et al. |

FOREIGN PATENT DOCUMENTS

| | | |
|---|---|---|
| DE | 196 12 062 B4 | 4/2007 |
| DE | 10 2009 019 810 A1 | 11/2010 |
| DE | 10 2009 039 092 A1 | 3/2011 |
| DE | 10 2011 116 313 A1 | 4/2013 |
| DE | 10 2015 222 795 A1 | 5/2017 |
| EP | 2 489 990 A1 | 8/2012 |
| EP | 2 944 504 A2 | 11/2015 |
| JP | 2005-9381 A | 1/2005 |
| JP | 2007-237792 A | 9/2007 |
| JP | 2007-253864 A | 10/2007 |
| WO | WO 2005/050146 A1 | 6/2005 |
| WO | WO 2012/175839 A1 | 12/2012 |
| WO | WO 2014/033380 A1 | 3/2014 |

OTHER PUBLICATIONS

International Search Report (PCT/ISA/210) issued in PCT Application No. PCT/EP2018/061555 dated Aug. 31, 2018 with English translation (four (4) pages).
German-language Written Opinion (PCT/ISA/237) issued in PCT Application No. PCT/EP2018/061555 dated Aug. 31, 2018 (five (5) pages).
Cover page of EP 1687596 A0 published Aug. 9, 2006 (one (1) page).
Chinese-language Office Action issued in Chinese Application No. 201880008398.X dated Nov. 22, 2021 with English translation (14 pages).

DISPLAY UNIT FOR A HYBRID VEHICLE

CROSS REFERENCE TO RELATED APPLICATIONS

This application is a continuation of PCT International Application No. PCT/EP2018/061555, filed May 4, 2018, which claims priority under 35 U.S.C. § 119 from German Patent Application No. 10 2017 207 642.9, filed May 5, 2017, the entire disclosures of which are herein expressly incorporated by reference.

BACKGROUND AND SUMMARY OF THE INVENTION

The invention relates to a display unit for a hybrid vehicle, in particular for displaying the fuel consumption and/or the residual range.

A large number of methods for determining and displaying residual ranges in motor vehicles, in particular also in electric vehicles and/or hybrid vehicles, is already known.

At present, a residual range (basic residual range) which is obtained from the ratio of the current content of the fuel tanks or content of the energy store with respect to the current fuel consumption or energy consumption is determined in virtually every vehicle and displayed, for example, within the scope of an onboard computer function or in the combination instrument.

DE 196 12 062 B4 discloses a display unit for data which are dependent on the energy consumption of a vehicle, wherein instead of a residual range value a range of values of the residual range is displayed and is determined as a function of the quantity of energy currently contained in the energy store, taking into account various driving styles and various driving conditions. The limits of the range of values can be determined taking into account various driving styles and various driving conditions of a vehicle-specific, and if appropriate, of a driver-specific consumption spectrum. By evaluating the individual driving behavior of the driver over a specific time period, the displayed range of values of the residual range can be adapted empirically.

For example, DE 10 2009 039 092 A1 discloses a method for determining at least two of the different defined residual ranges in such a way that through their representation the driver can quickly recognize whether his driving style is energy-efficient or how great is the difference between his driving style and an energy-efficient driving style.

DE 10 2011 116 313 A1 discloses a display of energy influences in a hybrid vehicle, wherein, in particular, the three variables of the overall fuel consumption, electric energy intake and energy reflux from the recuperation are indicated.

DE 10 2015 222 795 A1 discloses a display unit by means of which, in the event of a temporary failure of partial components, the display of the residual range which is dependent thereon can be masked out.

The object of the invention is to provide a functional extension of a display system for displaying the residual range.

The invention relates to a display unit for a hybrid vehicle having at least one internal combustion engine-powered drive and at least one electric motor-powered drive. The display unit comprises the following components: a first electronic determining module for determining the proportion of the current or averaged total fuel consumption which is used to charge the energy accumulator for the electric motor-powered drive and/or for determining the proportion of the current or averaged overall fuel consumption which is used to drive the hybrid vehicle; and a first display element for displaying at least this determined charge/fuel proportion and/or this determined drive/fuel proportion in addition to the overall fuel consumption.

In particular, the charge/fuel proportion and/or the drive/fuel proportion are determined from the current or averaged overall fuel consumption when the acceleration pedal is actuated or in the case of an automatic increase in the load point in the at least partially internal combustion engine-powered drive mode.

If the internal combustion engine-powered drive is a range extender, the display of the drive/fuel proportion would be the proportion which corresponds to the recharging of the energy extracted for the electric motor-powered drive.

The basic concept of the invention is therefore to control a consumption display in such a way that the driver is provided with knowledge about how the high-voltage accumulator is charged, in particular with which fuel consumption and how quickly during travel by branching off internal combustion engine-provided power, in particular after the load has been raised.

The invention is based on the following considerations.

Hybrid vehicles are currently equipped with a charging function which can charge the traction battery (high-voltage accumulator) during travel by branching off internal combustion engine-provided power (raising the load point) by means of an electric machine.

From the point of view of the driver, the additional information about how quickly the accumulator is currently being charged (acquired electrical range per unit of time or per unit of distance traveled) and if the accumulator can make available the desired electrical range can be useful during an active charging function onboard, that is to say during travel.

The currently known display strategies do not provide a display which provides the driver with additional quantitative information which goes beyond the current charging status.

In the load point raising mode, the internal combustion engine or range extender makes available both the power for the direct propulsion of the vehicle at the wheel as well as the power which is converted into electrical energy in the electric machine.

Currently, both proportions (propulsion and charging proportion) are combined in the instantaneous fuel consumption display and are not indicated separately. The propulsion proportion can be metered directly by the driver by means of the accelerator pedal, but the charging proportion is regulated by the operating strategy, and the driver does not have any direct influence on it.

It is a disadvantage that a very high average consumption or instantaneous consumption is suggested to the driver during the charging phase and there is no plausible explanation as to why the consumption is so high and how it is made up during the charging phase. It is a further disadvantage that the behavior of the instantaneous fuel consumption display cannot be controlled/metered directly by the driver, as the two proportions are displayed in a superimposed fashion.

The invention is intended to display the current charging power or charging speed plotted against the raising of the load point in an electrical range prediction per unit of time or per unit of distance traveled. Furthermore, the instantaneous fuel consumption display is preferably subdivided into a propulsion proportion and a charging proportion as a function of the current charging power or charging rate.

This information is displayed to the driver as additional information, in order, for example, to assist the route planning or to permit determination of costs in the comparison between costs per battery charge at the charging plug and costs per onboard charging.

This results, for example, in the following units which the driver can configure freely in the vehicle:

(i) charged electrical range in [km] per unit of time [min] and charged electrical range in [km] per unit of distance traveled, and/or (ii) separate fuel consumption display, e.g. [liters per 100 km], [liters per unit of time], [liters per km of charged electrical range], [charged electrical range in km from one liter], where only the quantity of fuel consumed to make available the charging power is taken into account or dimensionless (that is to say relative) (e.g. zero—low—medium—high).

The present invention advantageously represents the fuel consumption in a manner which can be freely selected by the customer; provides various representation possibilities; and displays the specific fuel consumption during the charging phase.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
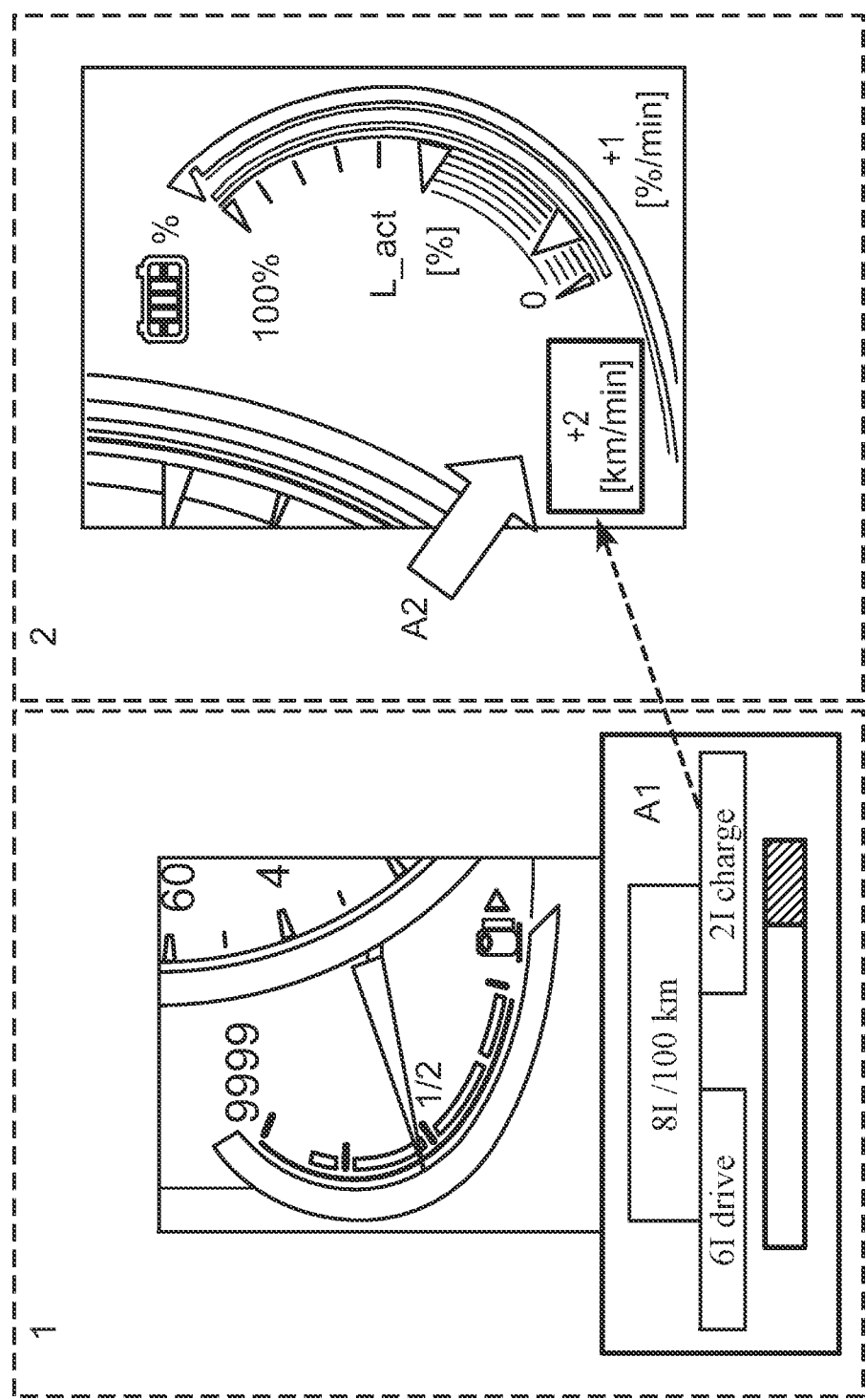
FIG. 1 is a schematic view of components of an exemplary display unit according to the invention, in particular for displaying the charging speed and the charge/fuel proportion.

FIG. 1 illustrates a first display element A1 and a second display element A2 for a hybrid vehicle (not illustrated in more detail), in particular for a combination instrument and/or for a headup display. The first display element A1 serves at least to display a charge/fuel proportion, here e.g. "2 l charge". The second display element A2 serves at least to indirectly display the charging speed, here preferably in two various forms of representation, e.g. "+2 [km/min]" and a triangular arrow for characterizing a percentage increase in charge from +1[%/min] here within the display range, which is basically provided for displaying the current charging status L_ act. The combination instrument and/or the headup display of hybrid vehicles already have/has, according to the prior art, displays of the energy supply in the form of a state of charge of the high voltage accumulator as a percentage and/or the residual range of the electric drive in kilometers.

To be more precise, the display unit according to the invention in FIG. 1 comprises the following components:

(i) a first electronic determining module 1 for determining the proportion (here e.g. 2 l/100 km) of the current overall fuel consumption (here e.g. 8 l/100 km) which is used to charge the energy accumulator for the electric motor-powered drive, and for determining the proportion (here e.g. 6 l/100 km) of the current overall fuel consumption (here e.g. 8 l/100 km) which is used to operate or drive the hybrid vehicle;

(ii) a first display element A1 for displaying the determined charge/fuel proportion of here 2 l and of the determined drive fuel proportion of here 6 l in addition to the overall fuel consumption of here 8 l/100 km, wherein the display element in this exemplary embodiment provides, in addition to the specific numbers, a bar display for simple relative comparison of the two proportions;

(iii) a second electronic determining module 2 for determining the electrical increase in range based on the current determined charge/fuel proportion of here 2 l/100 km in two forms of representation, e.g. +2 [km/min] and +1[%/min]; and (iv) a second display element A2 for displaying the electrical increase in range +2 [km/min] and +1[%/min], as a result of which the charge rate can be easily viewed by the driver.

Examples of forms of representation of the first display element A1: Overall fuel consumption for driving and charging, e.g. 8 l/100 km, instantaneous fuel consumption for driving, e.g. 6 l/100 km, instantaneous fuel consumption for charging, e.g. 2 l/100 km, or e.g. in the following form of representation: −2 l/h or 2 l/charged electrical range or relative: low/middle/high and/or in a bar display (ratio for consumption for driving to the consumption for charging, see FIG. 1).

The average fuel consumption for charging can also be indicated, e.g. 3 liters/full charge of high voltage accumulator (3 [l/100%]).

Examples of forms of representation of the second display element A2: According to FIG. 1, the charging speed is indicated by +2 [km/min], that is to say in the form of representation of distance per unit of time. It could also be indicated as the distance gained per distance traveled, e.g. +2 [km/km]. Additionally or alternatively, the charging speed can also be indicated as a percentage per time with respect to the current or full charging status, e.g. +1[%/min]. According to the exemplary embodiment in FIG. 1, this form of representation is preferably illustrated in a superimposed fashion within the display for the current charge status L_ act.

Figure 2:
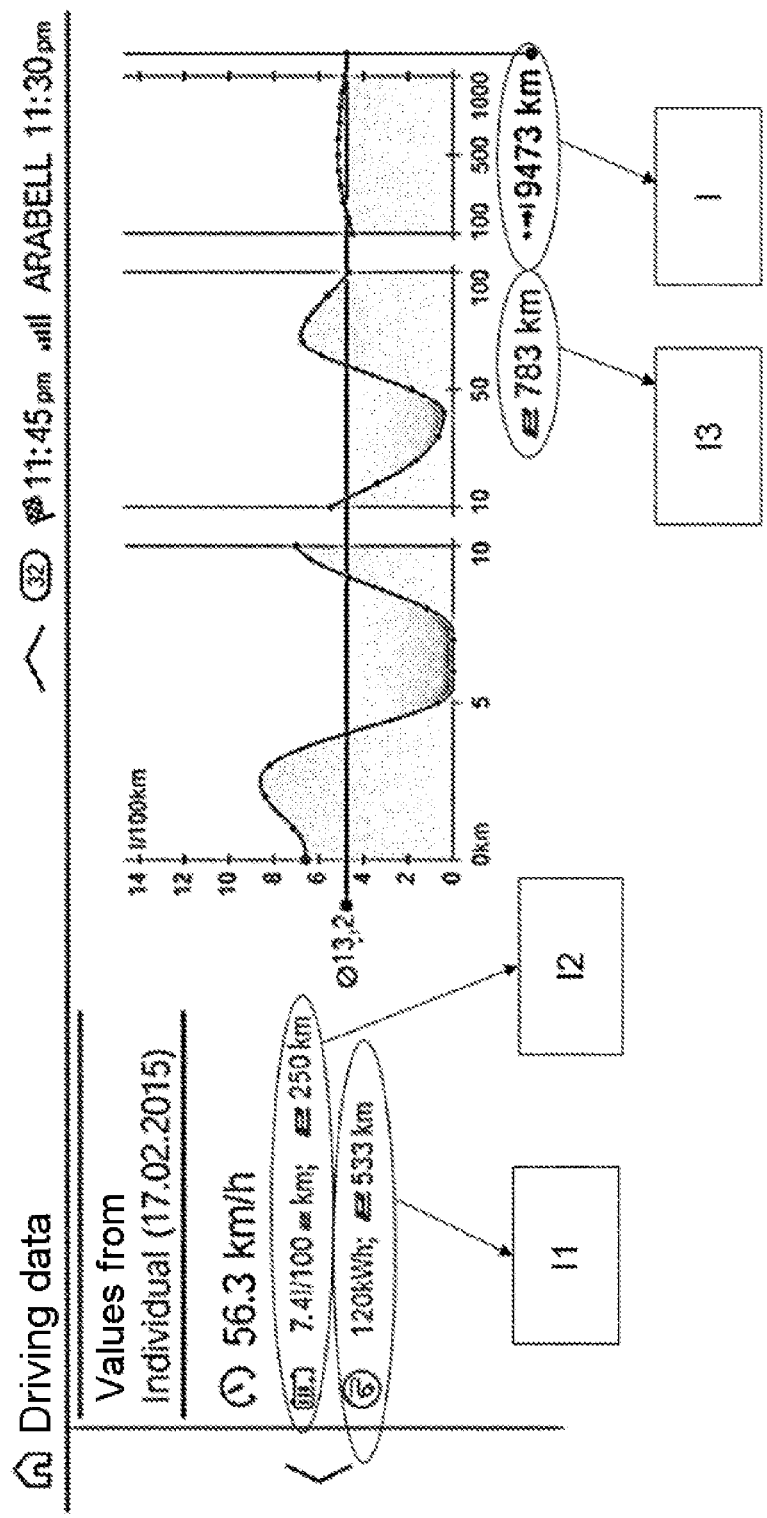
FIG. 2 is a possible supplementary display of driving data in an onboard computer.

Supplementary driving data are shown in an onboard computer in FIG. 2. Here, the information I1 to I4 is as follows:

I1=purely electrically traveled distance with energy (120 kWh) charged at the charging plug;
I2=purely electrically traveled distance with energy (specific consumption 7.4l per 100 km gained electrical range) charged "onboard" by means of the internal combustion engine (raising of the load point);
I3=purely electrically traveled distance; and
I4=total distance traveled.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A display unit for a hybrid vehicle having at least one internal combustion engine-powered drive and at least one electric motor-powered drive, the display unit comprising:
a first electronic determining module that determines a charge/fuel proportion and a drive/fuel proportion, wherein the charge/fuel proportion is a proportion of total fuel consumption which is used to charge an energy accumulator for the electric motor-powered drive, the drive/fuel proportion is a proportion of the total fuel consumption which is used to drive the hybrid vehicle, and a sum of the charge/fuel proportion and the drive/fuel proportion is equal to the total fuel consumption; and a first display element that receives the charge/fuel proportion and the drive/fuel proportion from the first electronic determining module, and displays the charge/fuel proportion, the drive/fuel proportion, and the total fuel consumption.

2. The display unit according to claim 1, further comprising:

a second electronic determining module that determines an electrical increase in range on the basis of the charge/fuel proportion; and a second display element that displays the electrical increase in range in at least one defined form of representation.

3. The display unit according to claim 2, wherein a form of representation of the electrical increase in range is defined by:

a route extension per unit of time, an increase in charge per unit of time, or a route extension per route section traveled, in addition to a display of a current charge status.

4. The display unit according to claim 3, wherein the form of representation of the electrical increase in range is defined within the display of the current charge status.

* * * * *